Feb. 23, 1960     J. H. CANTLIN ET AL     2,926,209
THERMOCOUPLE HARNESS
Filed Oct. 17, 1955     6 Sheets-Sheet 1
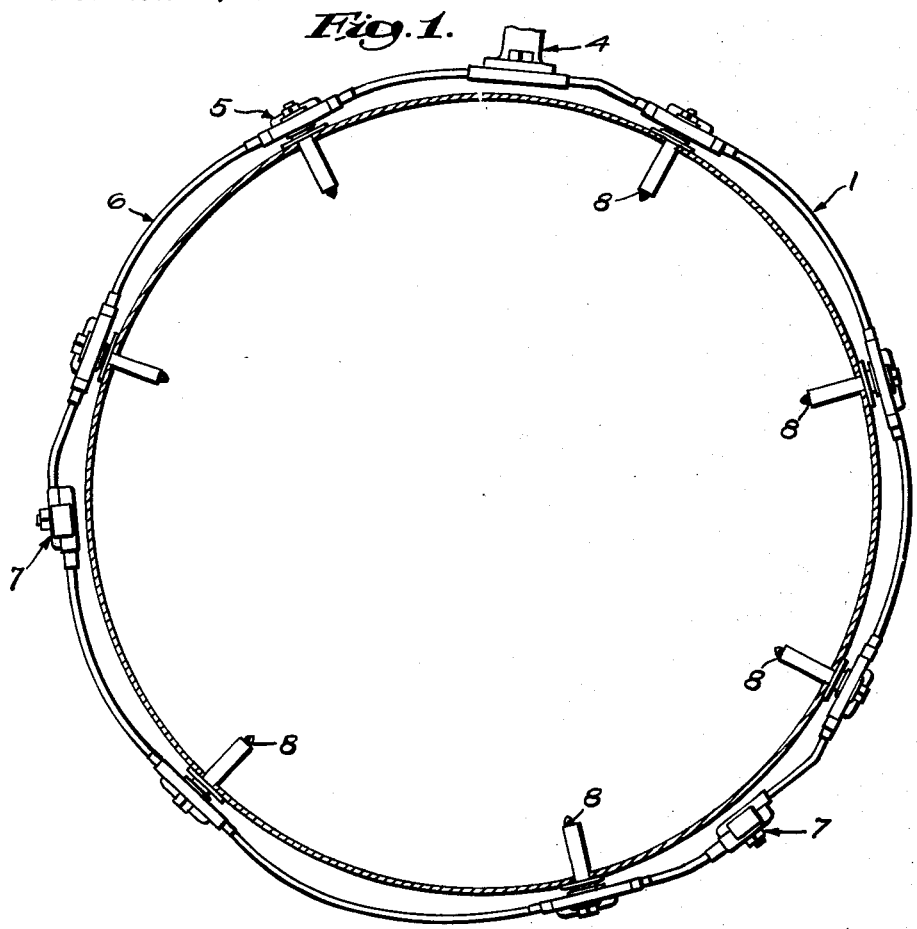
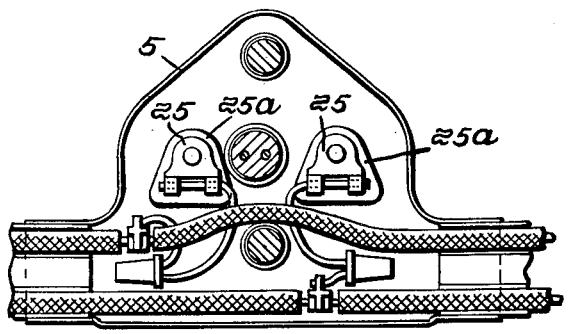
Inventors:
John H. Cantlin,
Eric E. Anderson,
by Emery, Booth, Townsend, Miller & Widner
Attys Feb. 23, 1960 J. H. CANTLIN ET AL 2,926,209
THERMOCOUPLE HARNESS
Filed Oct. 17, 1955 6 Sheets-Sheet 2
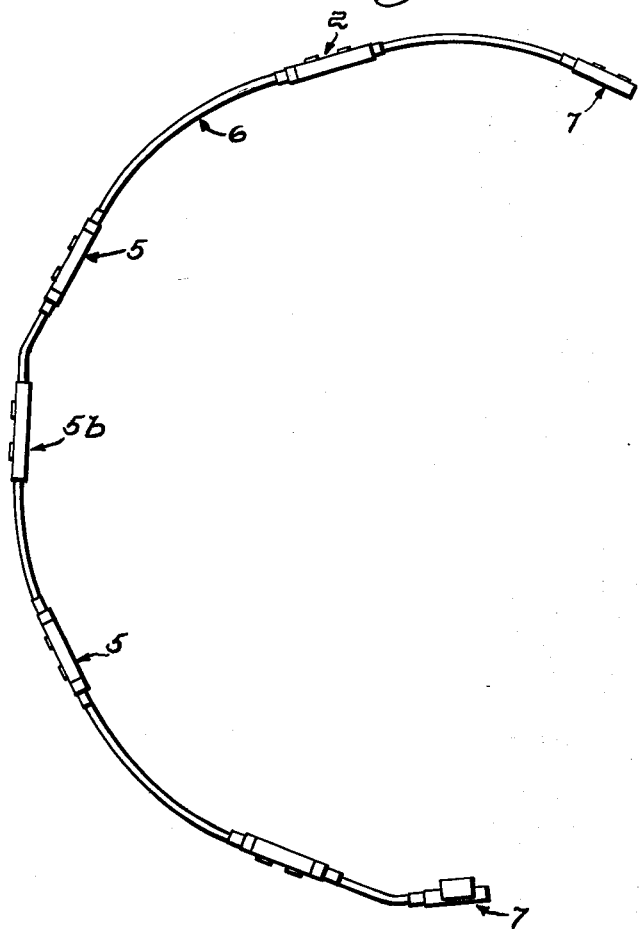
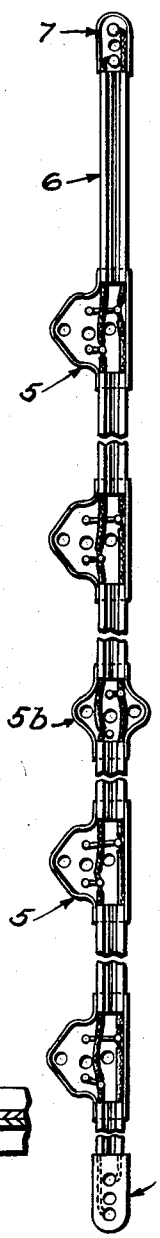
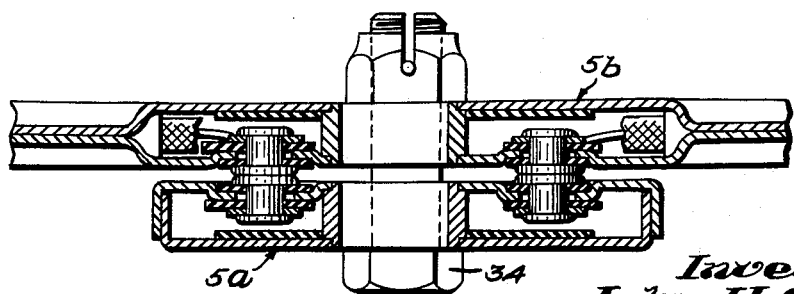
Inventors:
John H. Cantlin,
Eric E. Anderson,

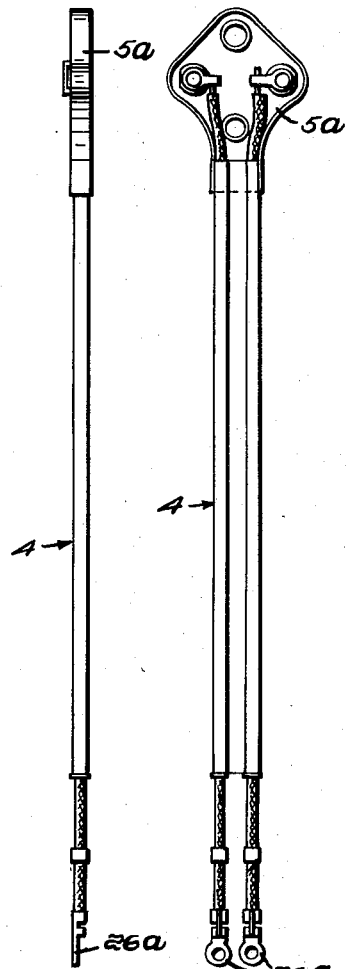
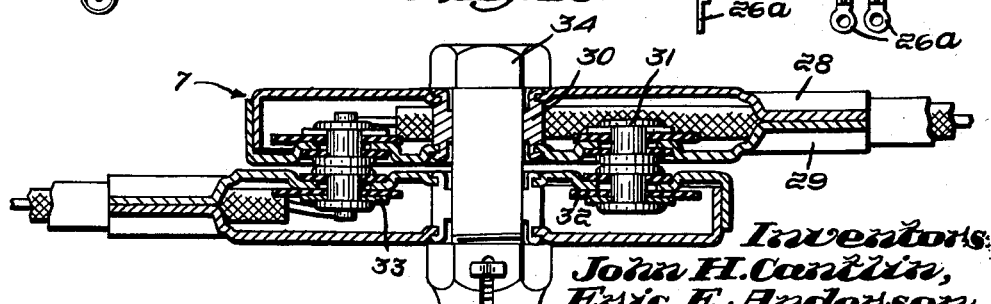

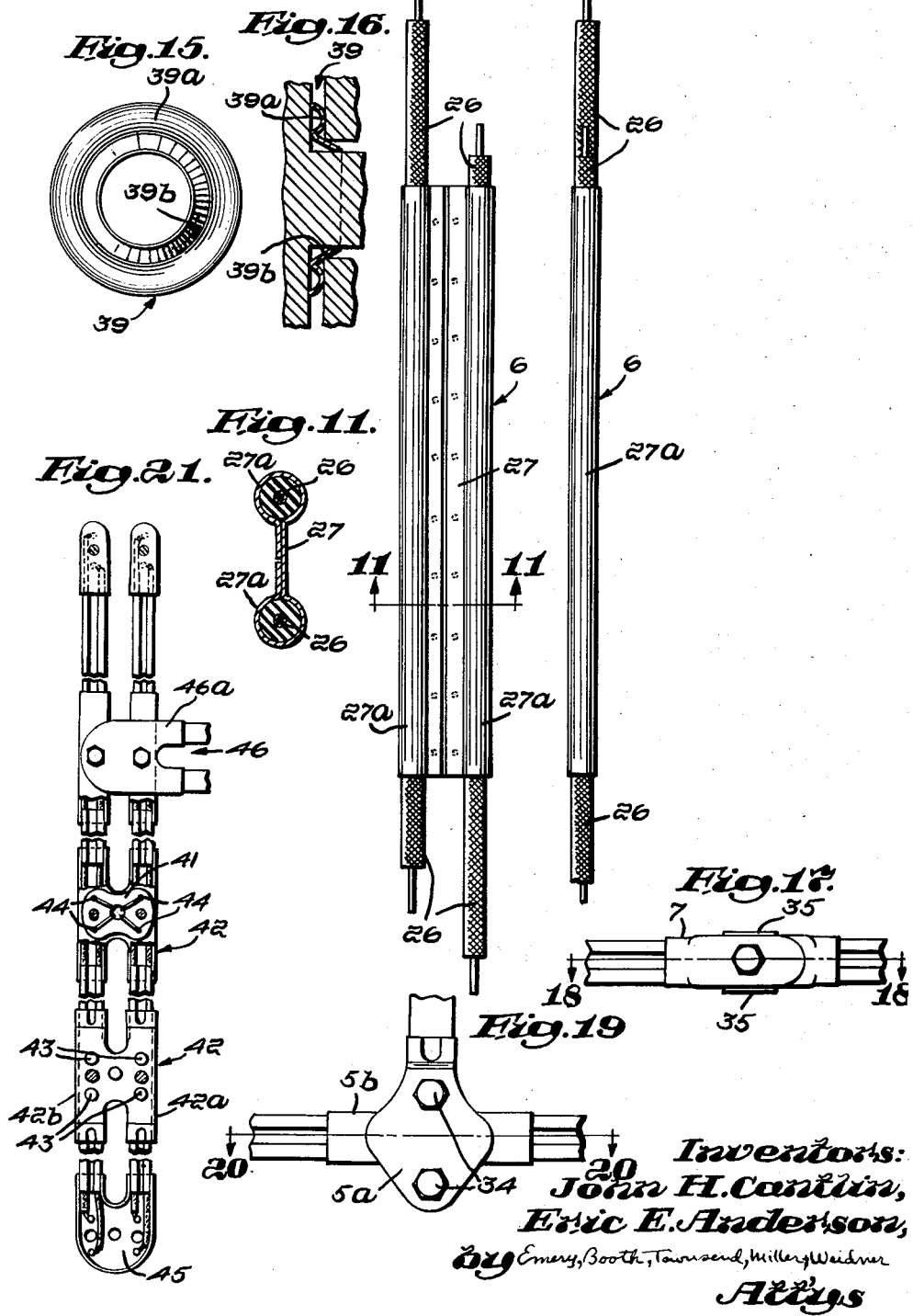

Feb. 23, 1960 J. H. CANTLIN ET AL 2,926,209
THERMOCOUPLE HARNESS
Filed Oct. 17, 1955 6 Sheets-Sheet 5
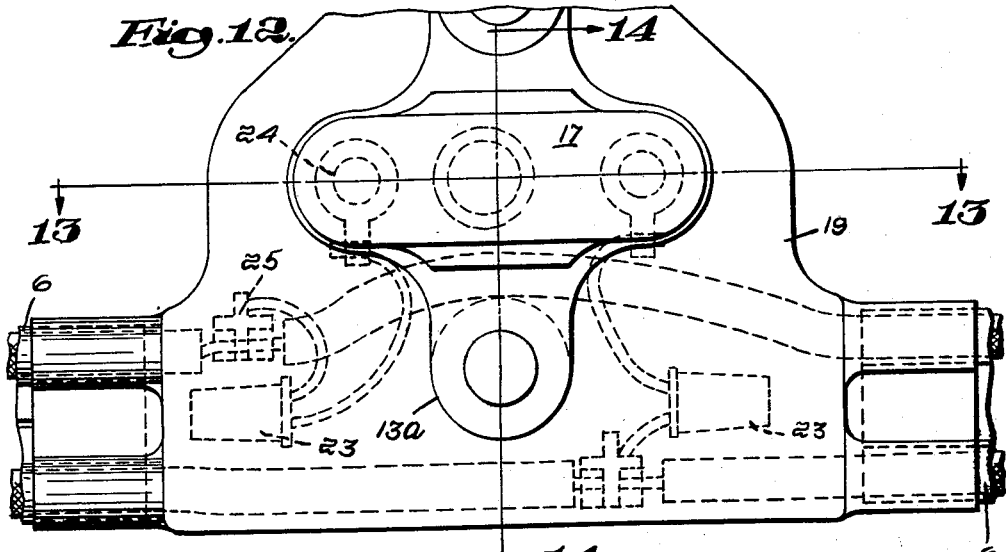
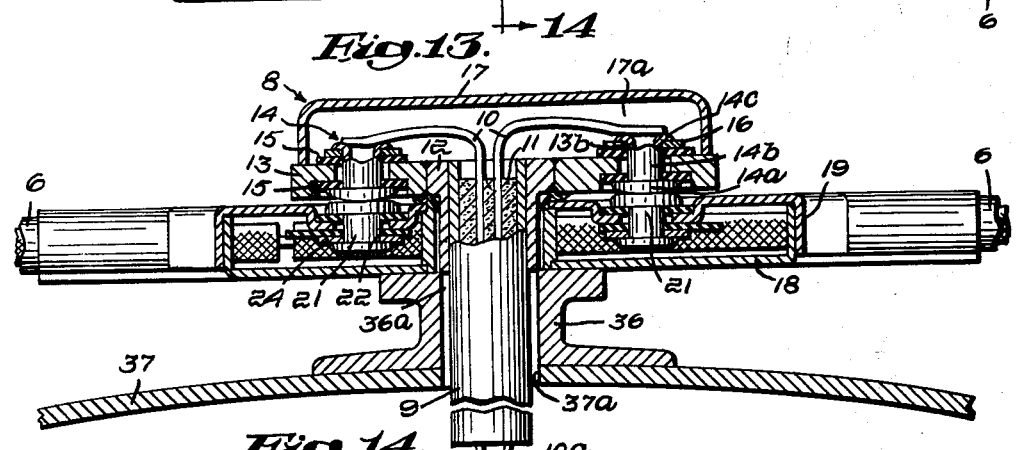
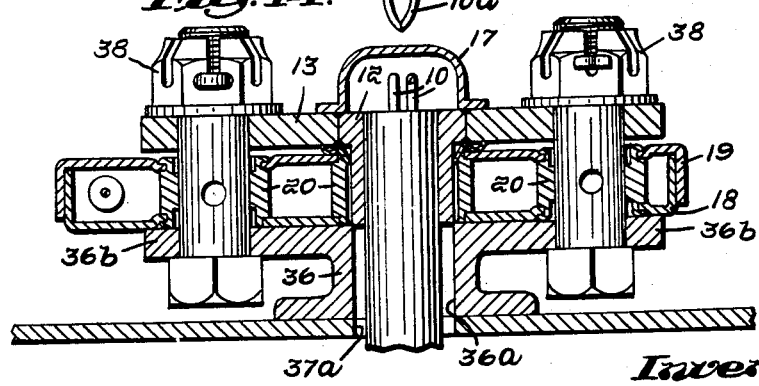
Inventors:
John H. Cantlin,
Eric E. Anderson,
By Emery, Booth, Townsend, Miller & Weidner Attys

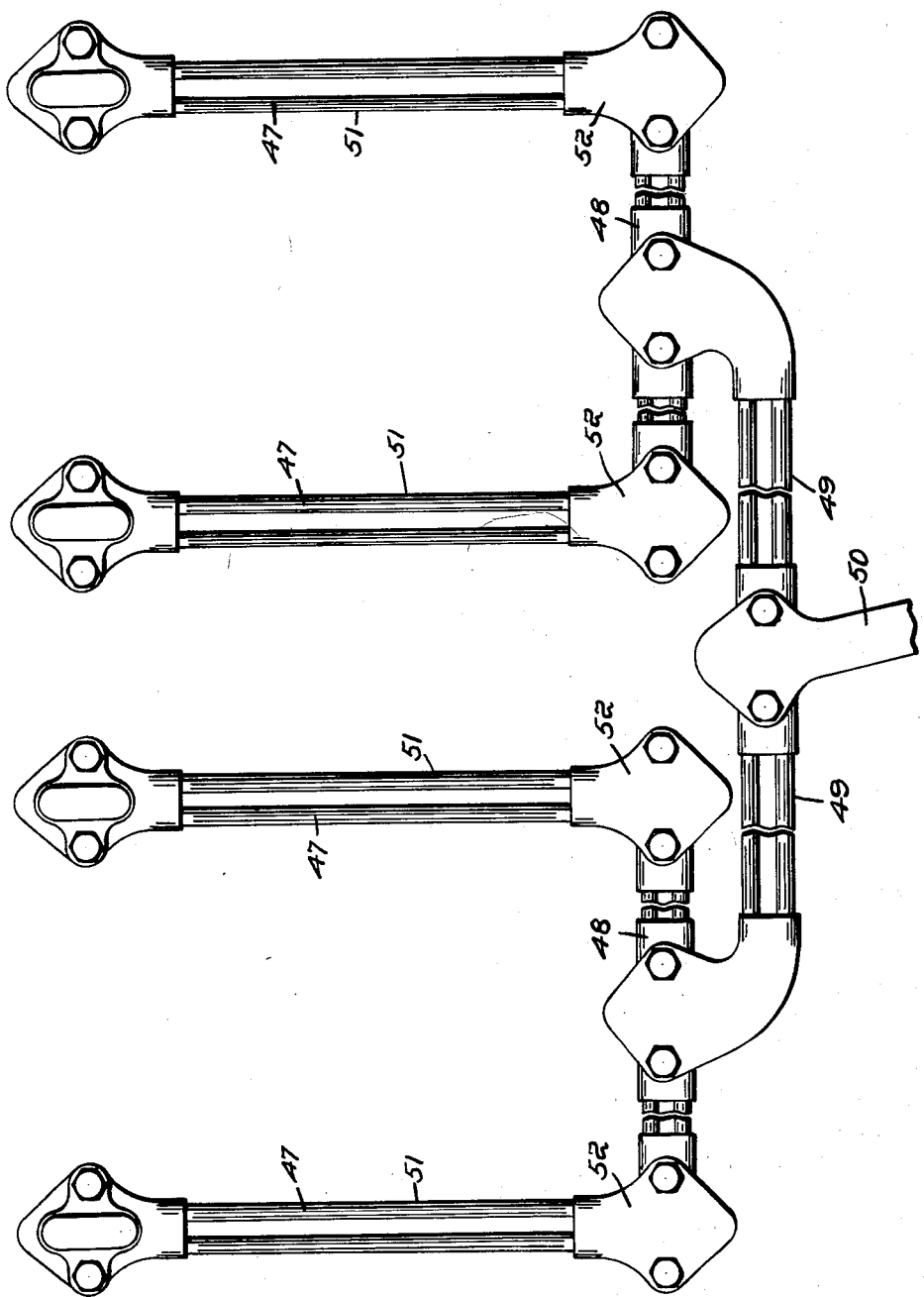

United States Patent Office 2,926,209
Patented Feb. 23, 1960

2,926,209

THERMOCOUPLE HARNESS

John H. Cantlin, Short Hills, N.J., and Eric E. Anderson, Needham Heights, Mass., assignors to Fenwal Incorporated, Ashland, Mass., a corporation of Massachusetts Application October 17, 1955, Serial No. 540,824

19 Claims. (Cl. 136—4)

This invention relates generally to heat and temperature sensing, indicating and controlling means of the thermocouple type, and more particularly to thermocouple apparatus such as employed for detecting and regulating the temperature of the exhaust or propulsion gas streams of jet or turbo-jet aircraft.

In the operation of jet and turbo-jet aircraft the temperature of the aircraft gas or jet stream must be maintained and controlled within a critical range below which insufficient thrust is indicated and above which the burning of the engine and aircraft may be caused. Aircraft of the high speed types here concerned are known also to be subjected in operation to very great stress, strain and shock. Accordingly, the thermocouple apparatus must not only be adapted to elevated states and rapid changes of temperature; it must be characterized also by rugged, durable design and construction. Preferably also it is distinguished by the ability to continue operative notwithstanding damage or failure in or at some part or point thereof.

The design of the thermocouple apparatus such as here concerned is governed further by the fact that the temperatures obtaining in any of several cross sections of the aircraft gas stream may vary considerably, whereby a meaningful measurement requires in practice the averaging of a number of readings taken at a like number of points spaced about the periphery of the gas turbine tail cone or pipe. Accordingly, a plurality or group of thermocouples is mounted about the tail cone or pipe of a jet aircraft in such a way that the failure of any one does not affect or nullify the functioning of any other, and so that their total or average indication is utilized as the significant value or measurement of gas stream temperature. These multiple thermocouple arrangements are characterized still further and in one type by the connection of resistors in series with the thermocouples to balance or equalize their influence on the indicated output. In another form the averaging is by circuitry or parallel connection of the thermocouples. In either case the multiple or combined thermocouple signal is transmitted through common terminals to the desired recording, indicating, and controlling instruments which may be remotely positioned and which may derive and measure a net E.M.F. Thus the thermocouple and harness apparatus here concerned comprises a set of heat sensing probes arranged about the tail cone or pipe of an aircraft and an assembly of coupled segments constructed and arranged both as mechanical supports for and as electrical connectors of the thermocouples, and which serve to transmit the mentioned signal to, say, the aircraft cockpit.

Operational experience has shown that conventional thermocouple harness constructions have certain features and characteristics which deny them that high degree of efficiency and accuracy required for the safe, reliable operation of the aircraft, and as contemplated by the present invention. More particularly, they employ terminals, connectors, and conductors such as designed for and heretofore used in applications relatively free from the severe operating conditions here concerned. Screw terminals and connectors of the braided wire and rigid tube, magnesium oxide insulated types are commonly used. These conventional connectors will be understood to require and to be complicated by the usual studs and posts, and screw or nut type fastening means. As conventionally adapted and employed, such apparatus has proven cumbersome, of insufficient strength, and susceptible to damage and destruction.

The present invention has for its main object the provision of multiple thermocouple mounting and connecting means and apparatus of more rugged and durable design and construction, and withstanding better the service conditions here concerned. The invention aims further to provide a thermocouple harness characterized by novel electrical connection means improving on and eliminating the conventional studs and the like such as heretofore required. The still further object of the invention is to provide a thermocouple harness distinguished by greater simplicity, accuracy, and ease of construction, installation, and servicing.

The invention will be better understood from a consideration of the following specification taken in conjunction with the accompanying drawings in which:

Fig. 1 is an assembly view of a preferred embodiment of the invention harness;

Fig. 2 is a side view of the harness upper branch;

Fig. 3 is a plan view of the branch as seen rolled out flat and with the covers of the terminal boxes removed;

Fig. 4 is a side view of the harness lower branch;

Fig. 5 is a developed plan of the lower branch similar to that of Fig. 3;

Fig. 6 is a larger scale plan of one of the terminal boxes, as seen with its cover removed;

Fig. 7 is a side view of the take-off element of the harness;

Fig. 8 is a plan view of the same as seen with the terminal box cover removed;

Fig. 9 is a side view of a shield and wire segment of the invention harness;

Fig. 10 is a bottom plan of the same;

Fig. 11 is a section through the line 11—11 of Fig. 10;

Fig. 12 is a top plan of a terminal box as assembled with and connected to a thermocouple;

Fig. 13 is a section along the line 13—13 of Fig. 12 and indicating the mounting of the terminal box on and exposure of the thermocouple through the aircraft tail pipe;

Fig. 14 is a section along the line 14—14 of Fig. 12, and showing more particularly the fastening of the thermocouple, terminal box and terminal box mounting means;

Fig. 15 is a plan of a gas seal member;

Fig. 16 is a vertical section, on a larger scale, of the gas seal member of Fig. 15, as seen in the probe sealing position;

Fig. 17 is a plan of a connector coupling;

Fig. 18 is a larger scale section taken along the line 18—18 of Fig. 17 and illustrating more particularly the mechanical and electrical joining of the connector members;

Fig. 19 is a plan of the take-off coupling;

Fig. 20 is a section along the line 20—20 of Fig 19;

Fig. 21 is a plan of a segment of a double circuit modification of the harness; and Fig. 22 is a plan of a parallel circuit modification of the invention harness, shown as laid out flat.

In the preferred embodiment of Figs. 1–20 the thermocouple harness assembly 1 of the invention is seen as installed on the tail pipe or cone of a jet aircraft and to comprise generally an upper branch assembly 2, a lower branch assembly 3, and a take-off member or unit 4, Each of said branches 2, 3 comprises a set or series of probe contacting and supporting elements or terminal boxes 5, a series of shield and wire segments 6 spacing and connecting said boxes 5, and outer connector boxes 7 adapting the branch for mechanical and electrical connection of the one to the other assembly or branch.

Mechanically supported and electrically connected at the terminal boxes 5 are a like number of thermocouple heads or probes 8, Figs. 1, 12, 13, and 14, each comprising more particularly a tubular body or shell 9 in which parallel Chromel, Alumel or the like wires 10, 10 are housed and supported, and also insulated, as by the tube filling magnesium oxide core 11. The conductor wires 10, 10 extend beyond the tube ends, and are joined outward of one end to form the "hot" junction 10a. The probe shell or tube 9, which may be Inconel, is received and supported at its other end in an annular flanged sleeve or collar 12, with which it is united by a circular weld. The collar 12 is in turn coextensive with a rigid base or anchor plate 13, which is seen as centrally apertured for snug flush reception of the same. This base plate 13 is formed and fitted for both electrical coupling and mechanical fastening of the thermocouple 8, and with the probe or tube 9 supported through the wall of the tail pipe or cone for exposure to and sampling of the gas stream temperature. It is fashioned more particularly with apertured oppositely extending wings 13a for the mechanical fastenings, and normal to said wings with a pair of oppositely disposed openings 13b receiving electrical coupling means or terminals such as now to be described.

The present invention contemplates the use in the thermocouple head and also in the associated harness terminal and connector boxes of a new and improved type or form of electrical connector element or member. The electrical connector means of the invention may be described generally as of compact, durable construction, and of a design providing optimum or substantial engagement, one with the other.

In accordance with the invention, then, the thermocouple wires 10, 10 are electrically connected through a pair of Chromel, Alumel or the like contact elements or members 14 mounted in the mentioned base plate openings 13b, which are seen as oversized with respect to the interfitted portions thereof. The contact members 14 have a generally solid, cylindrical shape such as best affording desired firm contact. As herein embodied they are seen more particularly to comprise buttons formed at one end with a flat or rounded head 14a surmounting a reduced cylindrical shank or body 14b. The buttons 14 are insulated and supported from the plate 13 by mica washers 15, the one clamped between the head 14a and the plate 13, and the other between said plate and a metal washer 16 held on the button by peening over the end of the body 14b to form a flange or foot 14c.

The indicated fixed or rigid and insulative interfitting of the contact buttons 14 and plate 13 is distinguished further by the recessing of the plate 13 to receive the outer washer 15 and whereby only the button heads 14a project outwardly, and for minimum exposure permitting also the contacting hereinafter described. The thermocouple wires 10, 10 are connected to the contact buttons 14, 14 by turning their free ends oppositely down over the buttons and welding them to the feet 14c, as shown. These turned down, button connected wire ends are then protectively enclosed by and sealed in a cap or cover 17 which is welded to the plate 13, and pressure filled with high temperature cement 17a. Both the cap 17 and plate 13 will be understood to be fashioned preferably of corrosion and high temperature resistant stainless steel.

Considering now more particularly the terminal boxes 5 with which the thermocouples 8 are associated in the harness of the invention, the same are seen to comprise each a pair of mating interfitted base and cover elements 18, 19. The base and cover 18, 19, like the harness generally, are fashioned of a material such as stainless steel which is capable of withstanding the stress and strain, heat and cold attendant upon aircraft operation. They are shaped and formed generally to provide a chamber or housing flatted for interfitting with the thermocouple and mount members as hereinafter described and for minimum resistance to air flow, and proportioned also to receive and connect the lead wire and associated thermocouple signal transmitting means of the invention harness. The terminal boxes 5 have laterally spaced transverse through openings for the probe tubes 9 and for the thermocouple fastenings, and are supported thereat by the hollow rivets or mounting collars 20 spacing and also clamping the base and cover elements 18, 19.

Further in accordance with the invention the overlapped base and cover flanges are cut away at their opposite longitudinal ends to receive the shield and wire segments 6, and more particularly the exposed wire ends thereof, which wire ends may be spaced and positioned by clamping and welding the plates 18, 19 intermediate the same, Fig. 12. The terminal boxes 5 are additionally fitted, for transmitting the thermocouple signal to said shield and wire segments 6, with contact elements, members, or buttons 21, 21 which may be formed similarly as the buttons 14, 14, and having fixed or rigid and insulative support on mica washers 22, 22 and for projection through recessed oversized openings in the cover 18.

The contact buttons 21, 21 are seen to be connected to the shield and wire segments 6 through resistors 23, 23, the latter having leads connected to the buttons 21 at the button carried clips 24 and to the mentioned wire ends at common terminal posts 25, 25 fixed to one box member 19. Both the base and cover members 18, 19 will be understood to be insulated by mica mats 25a underlying the posts 25 and resistors 23, and abutting also the clips 24, 24.

In the assembly of the terminal boxes 5 and with the shield and wire segments 6 the several conductor and resistor wire leads are clamped, and may also be welded, in the indicated lugs on the clips 24 and posts 25; the base 18 and cover 19 are then welded as above noted and also riveted, as by the collars 20. The boxes may then be charged, similarly as the thermocouples 8 and also the connector boxes 7, with insulative cement, as may be filled through a hole provided in the collar 20.

The terminal box spacing and connecting shield and wire segments 6 as best shown in Figs. 9–11 comprise simply a pair of insulated wires 26 and an integral shield plate 27 rolled or stamped to present parallel spaced wire enveloping and protecting channels or tubes 27a, 27a and having its free longitudinal margins folded about the wires and back upon the intermediate tube spacing plate portion, and there retained as by stitch welding. These lateral terminal box connecting shield and wire segments will be understood further to be of the similar light weight streamlined design and construction as already described for the associated elements of our improved harness and also to be of a flexibility permitting the indicated wrapping about the tail pipe or cone and also the bending flowing from deformation thereof, as hereinafter mentioned.

Referring again to Fig. 1, the several, herein upper and lower branch assemblies 2, 3 of our novel harness 1 comprising each a desired number of terminal boxes 5 connected by appropriate lengths of the wire segments 6, include also and are joined at their opposite ends by the outer or single-ended connector boxes 7. As shown more particularly in Figs. 2–5, 17, and 18 the connector boxes 7 provides generally flatted rectangular interfitted tray or base and cover members 28, 29 shown as rounded at the closed or dead end and which may be crimped and welded together about and between the wires 26 of the associated segment 6 at the other or open end of the box 7.

The connector box base and cover 28, 29 are formed also with a single central transverse through opening for fastening means, and are spaced and supported thereat by a hollow rivet or collar 30. They are seen further to mount at one face, herein the cover 19, and oppositely of said opening the contact buttons 31, said buttons insulated, as by the washers 32, and mounting the terminal clips 33, in the annular lugs of which the bared ends of wires 26 are clamped and welded, all similarly as in the construction and assembly of the terminal boxes 5, already described.

In the assembly of the harness the branches 2, 3 are coupled by inserting and clamping nut and bolt or the like fastening means 34 through the mentioned central openings of juxtaposed and oppositely faced connector boxes 7, whereby the harness is ordered as a unitary assembly for supporting and seizing the thermocouples in the desired generally uniformly spaced array about an annulus of the aircraft gas turbine tail pipe or cone. In this connection bearing plates 35 may be fixed to the one and for parallel positioning of the other of a coupled connector pair 7, 7 and whereby also the juxtaposition of contacts 31, 31 is assured.

From the foregoing it will be appreciated that the invention harness positions a plurality of the thermocouples 8 for exposure of the probe tubes 9 through openings in the aircraft wall and in a number and arrangement calculated to provide uniform accurate sampling of the gas stream. The thermocouples are supported more particularly for infacing projection of their tubes 9 through the terminal boxes 5 in the manner and via the openings already described.

Further in accordance with the invention, the thermocouple and terminal box assemblies 8, 5 and also the wire segments 6 are mounted about a circumference or periphery larger than that of the gas turbine tail pipe or cone, with each of the segments bowed out, so as to absorb without fault or injury the extension and contraction as may result from operational extremes of heat and cold, etc. To this end there is provided at each thermocouple position a support means or bracket 36, Figs. 12, 13, and 14 providing a base rounded for welding or securing otherwise to the tail pipe or cone 37, and a top shaped or flatted for rigid firm engagement with the terminal box 5. The bracket or similar support member 36 is characterized also by a central opening 36a for alignment with a like opening 37a in the pipe or cone 37, and in the present embodiment and similarly as the thermocouples 8 with oppositely extending, fastener supporting wings 36b.

In the assembly of the Figs. 12–14 apparatus the parts are oriented and interfitted with the probe tube 9 projecting inwardly through the aligned openings in the terminal box 5, support 36, and pipe or cone 37. The terminal box 5 is engaged flatwise over the bracket 36 and under the probe 8 and with the buttons 21, 21 upfacing for engagement with the downfacing thermocouple buttons 14, 14. The transverse through openings in all said parts are then aligned, and the assembly is clamped by the nut and bolt or equivalent fasteners 38 received therethrough.

It is noted in this connection that the efficiency and reliability of thermocouple harnesses have been seriously disadvantaged heretofore by contact carbonization such as flowing from the escape of hot gases through the probe receiving tail pipe openings 37a. Accordingly, the invention apparatus is distinguished still further by the provision of means for sealing the thermocouple mount against escape of, and exposure of the terminal box contacts to, the exhaust gases. As appearing from Figs. 13 and 14 and as shown also in Figs. 15 and 16 the gas seal means comprise a ring 39 of a special compound form and defined more particularly by outer dished or half round and inner reversed and conical parts 39a, 39b and by a proportioning such as affords it the indicated interfitting and multiple line engagement with the thermocouple tube 9 and base 13, and with the terminal box opening and also its face 19. It will be appreciated that the described configuration of seal ring 39 is also such as to permit its deformation by the tightening of the fasteners 38 and so as to pressure the described multiple line, mount sealing contact.

It will be understood also that the desired firm clean engagement of the contacts 14, 21 may be facilitated by appropriate design of the parts themselves. Accordingly, in the invention harness each contact pair 14, 21 is characterized also by the engagement of a round with a flat head button, Fig. 13, as best calculated to provide the desired intimate wide area engagement, under pressure of the fasteners 38.

Further in accordance with the invention, the design and construction of the parts is such that the probe and terminal box contacts 14, 21 are at all times under compression. It will be readily appreciated that this may be variously accomplished, as by fashioning the thermocouple head 8 of a material selected for the appropriate spring characteristics, or by incorporating spring washers on the fastenings 38.

A hazard flowing from the otherwise advantageously duplicate uniform design and construction of the harness elements is the possibility of inadvertent improper or reverse positioning or relating of the thermocouples 8 and terminal boxes 5, and of the separably coupled harness sections. Thus a still further important feature of the invention is the provision of means for the insuring of proper physical orienting of these connector mounting and connecting thermocouple and harness elements. The invention means will be understood to be exemplified by the construction of the thermocouple mount as now to be described. Referring particularly to Figs. 6, 12 and 14 the tube 9 and tube receiving collar 20 are seen as predeterminedly and similarly misaligned with the respective fastener receiving openings of the thermocouple 8 and terminal box 5. Accordingly, the assembly of the thermocouple mount, as by engaging the fasteners 38 through said openings, is permitted subject only to one or the desired polar relation of the contacts 14, 21.

The invention harness comprises further means for transmitting the thermocouple signal to the cockpit or other remote recording, indicating and controlling device. As variously oppearing from Figs. 1, 7, 8, 19, and 20 the take-off element 4 is seen to combine the similar shield and wire and terminal box members as the harness branches 2, 3, except that wires 26 may project appreciably from the channels 27a as for greater flexibility, and are fitted with clips 26a for connection to terminal posts or the like. The take-off 4 is distinguished also in that the terminal box 5a has a symmetrical or diamond configuration similarly as the box 5b on the harness upper branch, Fig. 2, to which it is coupled in the similar manner as already indicated for the corresponding harness elements. It will be appreciated that the remaining terminal boxes 5 might as readily have the indicated symmetrical shape in lieu of the laterally offset configuration shown herein, and providing, as may admit proximity of other of the aircraft fittings, a straight edge construction flush and continuous with shield and wire assemblies 6. The take-off and associated terminal boxes 4, 5a, 5b will be understood to duplicate further the offset probe tube and fastener opening construction assuring their proper connection, as heretofore described.

In Fig. 21 we show a double circuit modification of the harness in which the several harness elements are duplicated so as to provide and carry double circuit or the like wire pairs, and as for connection to a thermocouple such as shown at 41, and having similarly duplicated wire and contact members. It will be appreciated that adapting the harness to the indicated double circuit application requires no modification but only duplication of the individual shield and wire segments 6 and outer connector boxes 7. The double circuit harness is thus differentiated merely in the provision of intermediate terminal boxes 42 of the duplicated construction shown and comprising more particularly chambers of general H form and constructed with end openings in both parallel legs 42a for the double wire pairs, with transversed through openings arranged normally thereto and in the cross arm 42b for the thermocouple tube and fasteners, and with double contact pairs 43 longitudinally opposite said openings and for juxtaposition with the similarly quadrantal contacts 44 on the thermocouples 41.

The double circuit branch illustrated in Fig. 21 will be seen also to provide a dead end or open ring harness. More particularly and at one end it has a single or closed ended terminal box 45 fitted with the contacts and openings constituting it a thermocouple mount, but without provision for coupling at its round, closed end to an associated harness branch.

In the double circuit embodiment of Fig. 21 the invention harness is modified also in the take-off element 46, which may in its terminal box portion 46a be given the similar configuration as the connector box 45, except as the fastener openings are arranged lengthwise as for clamping the same at right angles to one of the intermediate terminal boxes 42, from which the central probe tube opening may be similarly omitted.

Our novel harness is adapted also to the parallel circuit constructions hereinbefore mentioned and without departure from the scope and spirit of the invention. In Fig. 22 we show an apparatus representative of such parallel circuit construction and comprising more particularly a parallel array of lead wire assemblies 47, laterally extending branch assemblies 48 cross connecting pairs of said lead wire assemblies 47, and a lateral-vertical coupling assembly 49 joining the branches 48 and the indicator lead wire or take-off assembly 50.

The several elements 47–50 of the parallel circuit of Fig. 22 are seen to reflect the simple and efficient design and construction yielding the similar rugged and durable and also uniform mating duplicate parts as in the series circuit embodiments already described. More particularly they are seen to combine each the shield and wire elements 51 and at one or both ends and/or intermediate thereof the terminal boxes 52 each comprising the similar lead and contact anchoring, covering and connecting means as hereinbefore mentioned in connection with the Figs. 1–20 embodiment, and characterized also by the like flat streamlined construction. It should be noted that the parallel harness may variously be adapted to expansion of the tail pipe or tail cone as by a lateral sliding or slip joint mounting of the branch assemblies 48, as on slotted anchor straps. It will be apparent also that the shield and wire elements of the parallel circuit harness are uniformly of straight construction and that the configuration of the terminal boxes 52 varies only as the wires 51 are permitted or required straightline or right angular coupling thereto, and a longitudinal or lateral, right and left mounting and connection therein.

It will be understood that our invention is not limited to the particular embodiments thereof illustrated or described herein, and we set forth its scope in our following claims.

We claim:

1. A thermocouple and harness assembly comprising a set of thermocouples having fixed exposed terminals, a set of terminal boxes supporting said thermocouples and having fixed exposed contacts engaging said terminals, means removably fastening said thermocouples to said terminal boxes, shield means spacing between and rigidly fastened to said terminal boxes, and conductors carried by said shield means and connected to said contacts within said terminal boxes.

2. A set of thermocouples having fixed exposed terminals, a set of terminal boxes supporting said thermocouples and having fixed exposed contacts engaging said terminals, means removably fastening said thermocouples to said terminal boxes, means mechanically coupling said terminal boxes in a rigid unitary harness, and conductors carried by said coupling means and connecting said contacts in an electrical circuit.

3. A set of thermocouples having fixed exposed electrical connector means, a set of terminal boxes seating said thermocouples and having fixed exposed contacts engaging said thermocouple connector means, and a set of shield and wire segments spacing between said terminal boxes, said segments having channels mechanically fastened to the terminal boxes and in said channels conductors electrically connected to said contacts, said terminal boxes and channels forming a rigid unitary harness supporting and spacing said thermocouples, and said conductors and contacts forming an electric circuit interconnecting said thermocouple connector means.

4. A thermocouple harness comprising a set of rigid metal support elements adapted to seat a set of thermocouples having terminals, contacts on said support elements and arranged to engage said thermocouple terminals, a set of rigid metal segments between and fastened to said support elements, and a set of conductors carried by said segments and fastened at their ends to said contacts.

5. A harness for thermocouples having electrical connector means comprising a set of rigid metal boxes adapted to seat a set of the thermocouples and having electrical connector means disposed upon said seating to engage said thermocouple connector means, a set of rigid metal channel segments spacing between the intermediate and extensive of the end boxes, said segment set rigidly fastened to said box set, conductors carried and shielded by said channel segments and fastened to said box connector means, and rigid metal boxes at the extremities of the end extensive channel segments and having electrical connector means connected to said segment carried conductors, said boxes fitted and said connector means disposed for respective mechanical and electrical connection also in mating boxes and connector means.

6. For mechanically supporting and electrically connecting a set of thermocouples having exposed terminals, a unitary harness branch assembly comprising a set of rigid metal boxes adapted to seat the thermocouples, said boxes having contacts mounted through their walls and arranged to engage said thermocouple terminals, a set of rigid metal channel segments spacing between and rigidly fastened to said boxes, and a set of conductors shielded by said segments and extending within said boxes and there connected to said contacts.

7. A thermocouple having a probe tube presenting a pair of conductors joined at their one ends, a base plate supporting the tube, and electrical connector members on said plate and connected to the other ends of said conductor pair, said connector members comprising a pair of solid metal buttons, said buttons projecting only slightly from the plate and shaped in their exposed portions for substantial conductive contact in face engagement with mating connector members.

8. In combination, a probe tube presenting a pair of conductors joined at their one ends, a plate mounting the tube, contact members on the plate and connected to the other ends of said conductors, a box seating the plate, contact members on the box, means for coupling the plate and box with said plate contact members in spring pressed engagement with said box contact members, and electrically conductive means associated with said box and connected to said contact members for remote transmission of the probe signal.

9. The apparatus of claim 8 wherein said contact members comprise solid metal buttons formed in each engaged pair with heads mutually shaped for good electrical contact.

10. Apparatus for temperature sensing through a wall aperture comprising a base having an opening and fixed to the wall with said opening opposite said aperture; a thermocouple having a probe tube through said opening and aperture and presenting a pair of conductors joined at their one ends, a plate mounting said tube, and contacts on said plate and connected to the other ends of said conductors; a box having a cover seating said plate and mounting contacts opposite said plate contacts; and means coupling said plate, box and base and with said plate and box contacts in tensioned engagement.

11. In combination, a thermocouple having a probe tube presenting a pair of conductors joined at their one ends, a plate mounting the tube, and a pair of contacts on said plate and connected to said conductors at their other ends; a terminal box having a cover seating said plate and a pair of contacts supported through said cover in juxtaposition to said plate contact pair; and means for fastening said thermocouple to said terminal box cover and with said juxtaposed contacts in electrically conductive engagement.

12. The apparatus of claim 11 wherein at least one of said thermocouple plate and terminal box cover is fashioned of a predeterminedly resilient material whereby said contacts are engaged under spring pressure.

13. The apparatus of claim 11 wherein said plate and cover contacts comprise solid metal buttons formed in each engaged pair with heads mutually shaped for good electrical contact.

14. In combination, a thermocouple having a probe tube presenting a pair of conductors joined at their one ends, a plate mounting said tube, and contacts on said plate and connected to the other ends of said conductors; a box having a cover seating said plate, an opening receiving said tube, and contacts engaging said plate contacts; and said tube and opening positioned relative to said contacts such that said plate may be seated on said box cover with said contacts engaged in only the desired polar relation of the contacts.

15. A thermocouple harness comprising a set of rigid metal boxes adapted to seat a set of thermocouples and having contacts disposed to engage the thermocouple terminals, a set of rigid metal channel segments spacing between and fastened to said boxes, a set of conductors shielded by said segments and projecting into said boxes, and a set of resistors mounted in said boxes and coupled both to said box contacts and to said shielded conductors and whereby to connect said thermocouples in an electric circuit, said resistors selected for equal influence of said thermocouples in said circuit.

16. A thermocouple having a probe tube presenting a pair of conductors joined at their one ends, a plate mounting the tube, a pair of contacts insulatively supported through said plate, said contacts connected to said conductors at their other ends and having compact head portions projecting for minimum exposure, and a cover on said plate and sealing said conductors and contacts.

17. The apparatus of claim 16 wherein said head portions are supported and shaped for engaging mating contact head portions under endwise pressure and over an area sufficient for good electrical contact.

18. The apparatus of claim 16 wherein said contacts are supported through and said head portions overlie recessed portions of said plate.

19. In combination, a probe tube, a plate mounting the tube, a support seating the plate and having an aperture receiving said tube, a sealing ring having an outer dished portion between said support and plate and an inner conical portion between said aperture and tube, and means for releaseably clamping said plate to said support and so as to compress said dished and conical ring portions.

References Cited in the file of this patent

UNITED STATES PATENTS

| | | |
|---|---|---|
| 1,770,548 | Oven | July 15, 1930 |
| 1,784,217 | Berry | Dec. 9, 1930 |
| 1,843,835 | Romeiser | Feb. 2, 1932 |
| 1,856,335 | Hothersall | May 3, 1932 |
| 1,863,893 | Bailey | June 21, 1932 |
| 2,068,399 | Dash et al. | Jan. 19, 1937 |
| 2,410,218 | Kelly | Oct. 29, 1946 |
| 2,653,983 | Best | Sept. 29, 1953 |
| 2,690,462 | Duckwall | Sept. 28, 1954 |
| 2,698,352 | Fagg et al. | Dec. 28, 1954 |
| 2,698,872 | Broffitt | Jan. 4, 1955 |
| 2,782,296 | Walter | Feb. 19, 1957 |
| 2,796,455 | Jones | June 18, 1957 |
| 2,858,351 | Taylor | Oct. 28, 1958 |

FOREIGN PATENTS

| | | |
|---|---|---|
| 640,971 | Great Britain | Aug. 2, 1950 |
| 756,963 | Great Britain | Sept. 12, 1956 |
| 2,410,218 | Great Britain | Oct. 29, 1946 |
| 1,054,773 | France | Oct. 14, 1953 |

OTHER REFERENCES

Dahl et al.: "AF Technical Report No. 6546," pp. 1–20, July 1951.